(12) United States Patent
Barsoum et al.

(10) Patent No.: US 10,538,431 B2
(45) Date of Patent: Jan. 21, 2020

(54) NANOLAMINATED 2-2-1 MAX-PHASE COMPOSITIONS

(71) Applicant: Drexel University, Philadelphia, PA (US)

(72) Inventors: Michel W. Barsoum, Moorestown, NJ (US); Chunfeng Hu, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 15/554,904

(22) PCT Filed: Mar. 1, 2016

(86) PCT No.: PCT/US2016/020216
§ 371 (c)(1),
(2) Date: Aug. 31, 2017

(87) PCT Pub. No.: WO2016/140948
PCT Pub. Date: Sep. 9, 2016

(65) Prior Publication Data
US 2018/0044182 A1    Feb. 15, 2018

Related U.S. Application Data

(60) Provisional application No. 62/127,907, filed on Mar. 4, 2015.

(51) Int. Cl.
*C01B 21/06*    (2006.01)
*C01B 21/076*    (2006.01)
(Continued)

(52) U.S. Cl.
CPC ........ *C01B 21/0602* (2013.01); *C01B 21/062* (2013.01); *C01B 21/0605* (2013.01);
(Continued)

(58) Field of Classification Search
None
See application file for complete search history.

(56) References Cited

U.S. PATENT DOCUMENTS 4,801,368 A    1/1989  Yamashita et al.
6,180,049 B1   1/2001  Jang et al.
(Continued)

FOREIGN PATENT DOCUMENTS

EP    0 948 067 A1    10/1999
EP    1 381 099 A1    1/2004
(Continued)

OTHER PUBLICATIONS

Hu et al.; Mo2Ga2C: a new ternary nanolanninated carbide; Chem. Commun., 51, 6560-6563; Mar. 2015.*
(Continued)

*Primary Examiner* — Guinever S Gregorio
(74) *Attorney, Agent, or Firm* — BakerHostetler

(57) ABSTRACT

The present invention is directed to crystalline solids having an empirical formula of $M_2A_2X$, wherein M is at least one Group IIIB, IVB, VB, or VIB metal, preferably Cr, Hf, Sc, Ti, Mo, Nb, Ta, V, Zr, or a combination thereof; wherein A is Al, Ga, Ge, In, Pb, or Sn, or a combination thereof; and each X is $C_xN_y$, where x+y=1. In some particular embodiments, the crystalline composition has a unit cell stoichiometry of $Mo_2Ga_2C$.

12 Claims, 6 Drawing Sheets

(51) Int. Cl.
   *C01B 32/90* (2017.01)
   *C01B 21/072* (2006.01)
   *H01M 4/58* (2010.01)
(52) U.S. Cl.
   CPC ...... *C01B 21/0617* (2013.01); *C01B 21/0632* (2013.01); *C01B 21/072* (2013.01); *C01B 21/076* (2013.01); *C01B 32/90* (2017.08); *C01P 2002/72* (2013.01); *H01M 4/58* (2013.01)

(56) References Cited

U.S. PATENT DOCUMENTS

| | | |
|---|---|---|
| 6,555,268 B1 | 4/2003 | Inoue et al. |
| 7,446,190 B2 | 11/2008 | Sadelain et al. |
| 2002/0068488 A1 | 6/2002 | Tuller et al. |
| 2003/0148184 A1 | 8/2003 | Omaru et al. |
| 2003/0224168 A1 | 12/2003 | Mack et al. |
| 2004/0048157 A1 | 3/2004 | Neudecket et al. |
| 2004/0229028 A1 | 11/2004 | Sasaki et al. |
| 2007/0065725 A1 | 3/2007 | Inoue |
| 2007/0066503 A1 | 3/2007 | Basaly |
| 2009/0017332 A1 | 1/2009 | Kisi et al. |
| 2010/0236937 A1 | 9/2010 | Rosvall et al. |
| 2010/0322909 A1 | 12/2010 | Okada et al. |
| 2011/0017585 A1 | 1/2011 | Zhamu et al. |
| 2011/0104464 A1 | 5/2011 | Pyzik et al. |
| 2012/0247800 A1 | 10/2012 | Shah et al. |
| 2013/0092428 A1 | 4/2013 | Kawaguchi et al. |
| 2014/0162130 A1 | 6/2014 | Barsoum et al. |
| 2015/0210044 A1 | 7/2015 | Barsoum et al. |
| 2015/0306570 A1 | 10/2015 | Mayes et al. |

FOREIGN PATENT DOCUMENTS

| | | |
|---|---|---|
| JP | H08 78018 | 3/1996 |
| JP | H10 112316 | 4/1998 |
| JP | 2005 158725 | 6/2005 |
| JP | 2007 214137 A | 8/2007 |
| WO | WO 2002/081372 | 10/2002 |
| WO | WO 2002/096799 A2 | 12/2002 |
| WO | WO 2005/007566 | 1/2005 |
| WO | WO 2006/112869 A2 | 10/2006 |
| WO | WO 2007/093011 | 8/2007 |
| WO | WO 2007/093011 A1 | 8/2007 |
| WO | WO 2007/121931 A2 | 11/2007 |
| WO | WO 2009/063031 A2 | 5/2009 |
| WO | WO 2009/091826 A2 | 7/2009 |
| WO | WO 2010/128492 A1 | 11/2010 |
| WO | WO 2014/088995 A1 | 6/2014 |

OTHER PUBLICATIONS

Barsoum et al, "Room-Temperature Deintercalation and Self-Extrusion of Ga from Cr2GaN", Science, May 7, 1999, 284(5416), 937-939.
Barsoum et al, "The Topotactic Transformation of Ti3SiC2 into a Partially Ordered Cubic Ti(C0.67Si0.06) Phase by the Diffusion of Si into Molten Cryolite", Journal of the Electrochemical Society, 1999, 146(10), 3919-3923.
Barsoum, "Physical Properties of the MAX phases", Encyclopedia of Materials: Science and Technology, 2006, 11 pages.
Barsoum, et al., "Synthesis and Characterization of a Remarkable Ceramic: Ti3SiC2," J Amer. Chem. Soc., 1996 79(7), 1953-1956.
Barsoum, M. and El-Raghy, T., "The MAX Phases: Unique New Carbide and Nitride Materials", American Scientist, Jul.-Aug. 2001, 89:334-343.
Barsoum, M., "The MN+1AXN phases: New Class of Solids", Progress in Solid State Chemistry, Jan. 1, 2000, 28(1-4), 201-281.
Chang et al., "Synthesis of a new graphene-like transition metal carbide by de-intercalating $Ti_3AlC_2$", Mater. Lett., Oct. 2013, 109, 295-298.

Chen et al, "Microstructure and Phase Transformation of Ti 3 Ac 2 (A= Al, Si) in Hydrofluoric Acid Solution", Crystal Research and Technology, Oct. 27, 2014, 49(10), 813-819.
Chen et al., "In-situ synthesis of Ti3AlC2/TiC-Al2O3 composite from TiO2—Al—C system", Journal of Materials Science & Technology, 2006, 22, 455-458.
Coleman et al, "Two-Dimensional Nanosheets Produced by Liquid Exfoliation of Layered Materials", Science, Feb. 4, 2011, 331, 568-571.
Eis, PS et al, Accumulation of miR-155 and BIC RNA in Human B Cell Lymphomas. Proceedings of the National Academy of Sciences of the United States of America, Mar. 8, 2005, 102(10), 3627-3632, Abstract.
Eklund et al, "The Mn+1AXn Phases: Materials Science and Thin-Film Processing", Thin Solid Films, 2010, 518, 1851-1878.
Ettmayer et al., "Crystal structure of Cr3(C,N)2 and CrVC2", Monatshefte fur Chemie and Verwandte Teile Anderer Wissenschaften, Jul. 1966, vol. 97, Issue 4, 1258-1262.
European Patent Application No. 12803351.1: Supplementary European Search Report dated Jan. 30, 2015, 14 pages.
Finkel et al., "Magnetotransport properties of the ternary carbide Ti3SiC2: Hall effect, magnetoresistance, and magnetic susceptibility", Physical Review B, Jan. 15, 2002, vol. 65, Issue 3, 4 pages.
Ghidiu et al., "Conductive two-dimensional titanium carbide 'clay' with high volumetric capacitance", Nature, Dec. 2014, 516, 78-81.
Halim et al., "Transparent Conductive Two-Dimensional Titanium Carbide Epitaxial Thin Films", Chem. Mater., 2014, vol. 26, No. 7, 2374-2381, Abstract; p. 2376, Scheme 1, p. 2379, col. 1, para. 2; p. 2379, col. 2, para. 2.
Henadaoui et al., "Ti—Al—C MAX Phases by Aluminothermic Reduction process", International Journal of Self-Propagating High-Temperature Synthesis, 2008, 17, 125-128.
Hu et al. "Two-dimensional $Sc_2C$: A reversible and high-capacity hydrogen storage material predicted by first principles calculations", International Journal of Hydrogen Energy, Jul. 2014, 39, 20, 10606-10612.
Hu et al., "MXene: A New Family of Promising Hydrogen Storage Medium", J. Phys. Chem A, 2013, 117, 14523-14260.
Hu, C., "Low Temperature Thermal Expansion, High Temperature Electrical Conductivity, and Mechanical Properties of Nb4AlC3 Ceramic Synthesized by Spark Plasma Sintering", Journal of Alloys and Compounds, Nov. 13, 2009, 487(1-2), 675-681.
International Patent Application No. PCT/US13/072733: The International Search Report and the Written Opinion dated Mar. 28, 2014, pp. 1-12.
International Patent Application No. PCT/US13/64503: The International Search Report and the Written Opinion dated Jan. 24, 2014, pp. 1-13.
Jin et al., "Synthesis of VC—Cr3C2 Nanocomposite Powders by Carbothermal Reduction", Nanoscience and Nanotechnology Letters, Oct. 2012, vol. 4, No. 10, 1028-1030, Abstract, 1 page.
Korzhavyi et al, "Ab Initio Study of Phase Equilibria in $TiC_x$", Physical Review Letters, Dec. 18, 2001, 88(1), 1-4.
Kulkarni et al, Thermal Expansion and Stability of Ti2SC in Air and Inert Atmospheres, Journal of Alloys and Compounds, 2009, 469, 395-400.
Mogilevsky et al, "The Structure of Multilayered Titania Nanotubes Based on Delaminated Anatase", Chemical Physics Letters, 2008, 460, 517-520.
Myhra, et al., "Crystal-Chemistry of the $Ti_3AlC_2$ and $Ti_4AlN$ Layered Carbide/Nitride Phases—Characterization by XPS", Journal of Physics and Chemistry of Solids, Apr. 2001, vol. 62(4), 811-817.
Nadeau, "Clay Particle Engineering: a Potential New Technology with Diverse Applications", Applied Clay Science, 1987, 2, 83-93.
Naguib et al, "Mxene: A Promising Transition Metal Carbide Anode for Lithium-ion Batteries", Electrochemistry Communications, 2012, 16, 61-64.
Naguib et al, "New Two-dimensional Niobium and Vanadium Carbides as Promising Materials for Li-Ion Batteries", American Chemical Society, Oct. 2013, 135(43), 15966-15969.
Naguib et al, Synthesis of a New Nanocrystalline Titanium Aluminum Fluoride Phase by Reaction of Ti2aic With Hydrofluoric Acid,

(56) References Cited

OTHER PUBLICATIONS

RSC Adv. 1: 1493-1499, 2011. [retrieved on Mar. 7, 2014]. Retrieved from the internet: <URL: http://pubs.rsc.org .ezproxy.neu.ed u/en/Content/Articlelanding/2011/RA/c1ra00390a#/div, Abstract.
Naguib et al, "Two-Dimensional Nanocrystals Produced by Exfoliation of $Ti_3AlC_2$", Advanced Materials, 2011, 23, 4248-4253.
Naguib et al, "Two-Dimensional Transition Metal Carbides", American Chemical Society, Feb. 2012, 6(2), 1322-1331.
Naguib et al., "Mxenes: A new family of two-dimensional materials", Advanced Materials, 2014, 26, 992-1005.
Nan et al., "Percolation phenomena in niobium-doped TiC1-x", Materials Science and Engineering B-Solid State Materials for Advanced Technology, Feb. 1991, vol. 7, Issue 4, 283-286.
Peng et al., "Unique lead adsorption behavior of activated hydroxyl group in two-dimensional titanium carbide", Journal of the American Chemical Society, 2014, 136, 4113-4116.
Rao et al, "A Study of the Synthetic Methods and Properties of Graphenes", Science and Technology of Advanced Materials, 11, Oct. 27, 2010, 1-15.
Rudy, "Crystal structure of Ta2VC2", Journal of the Less-Common Motale, Jan. 1970, vol. 20, Issue 1, 49-55.
Savoskin et al, "Carbon Nanoscrolls Produced From Acceptor-Type Graphite Intercalation Compounds", 2007, Carbon, 45, 2797-2800.
Schmidt, et al., "XPS Studies of Amino Acids Absorbed on Titanium Dioxide Surfaces", Fresenius Journal of Analytical Chemistry, May 1991, 341, 412-415.
Spanier et al, "Vibrational Behavior of the Mn+1AXn phases from First-Order Raman Scattering „M=Ti ,V,Cr, A=Si, X=C,N)", Physical Review B, Jan. 2005, 71, 1-4.

Srinivasan, "Batteries for Advanced Transportation Technologies (BATT) Program. The fourth quarter 2014 FY report", Berkeley National Laboratory Document, Nov. 19, 2014, http://bmr.lbl.gov/wp-content/uploads/sites/3battfiles/reports/BATT_2014_4th_Quarterly_Report.pdf, 74 pages.
Stankovich et al, "Graphene-based Composite Materials", Nature, Jul. 2006, 442, 282-286.
Su et al., "High-Quality Thin Graphene Films from Fast Electrochemical Exfoliation", ACS Nano, 2011, 5(3), 2332-2339.
Tang et al., "Are MXenes Promising Anode Materials for Li Ion Batteries? Computational Studies on Electronic Properties and Li Storage Capability of $Ti_3C_2$ and $Ti_3C_2X_2$ (X=F, OH) Monolayer", Journal of the American Chemical Society, 2012, 134, 16909-16916.
Tran et al, "Lithium Intercalation in Porous Carbon Electrodes", Material Research Society 1995 Spring Meeting, San Francisco, CA, Apr. 17-21, 1995, 12 Pages.
Travaglini et al, "The Corrosion Behavior of Ti3SiC2 in Common Acids and Dilute NaOH", Corrosion Science, Jun. 1, 2003, 45(6), 1313-1327.
Tzenov et al, "Synthesis and Characterization of Ti3AlC2", Journal of the American Ceramic Society, Jan. 1, 2000, 83(4), 825-832.
Viculis et al, "A Chemical Route to Carbon Nanoscrolls", Science, Feb. 28, 2003, 299, p. 1361.
Viculis, et al., "Intercalation and Exfoliation Routes to Graphite Nanoplatelets", Journal of Materials Chemistry, 2005, vol. 15, 974-978.

* cited by examiner

FIG. 2(A-C)

FIG. 3(A-E)
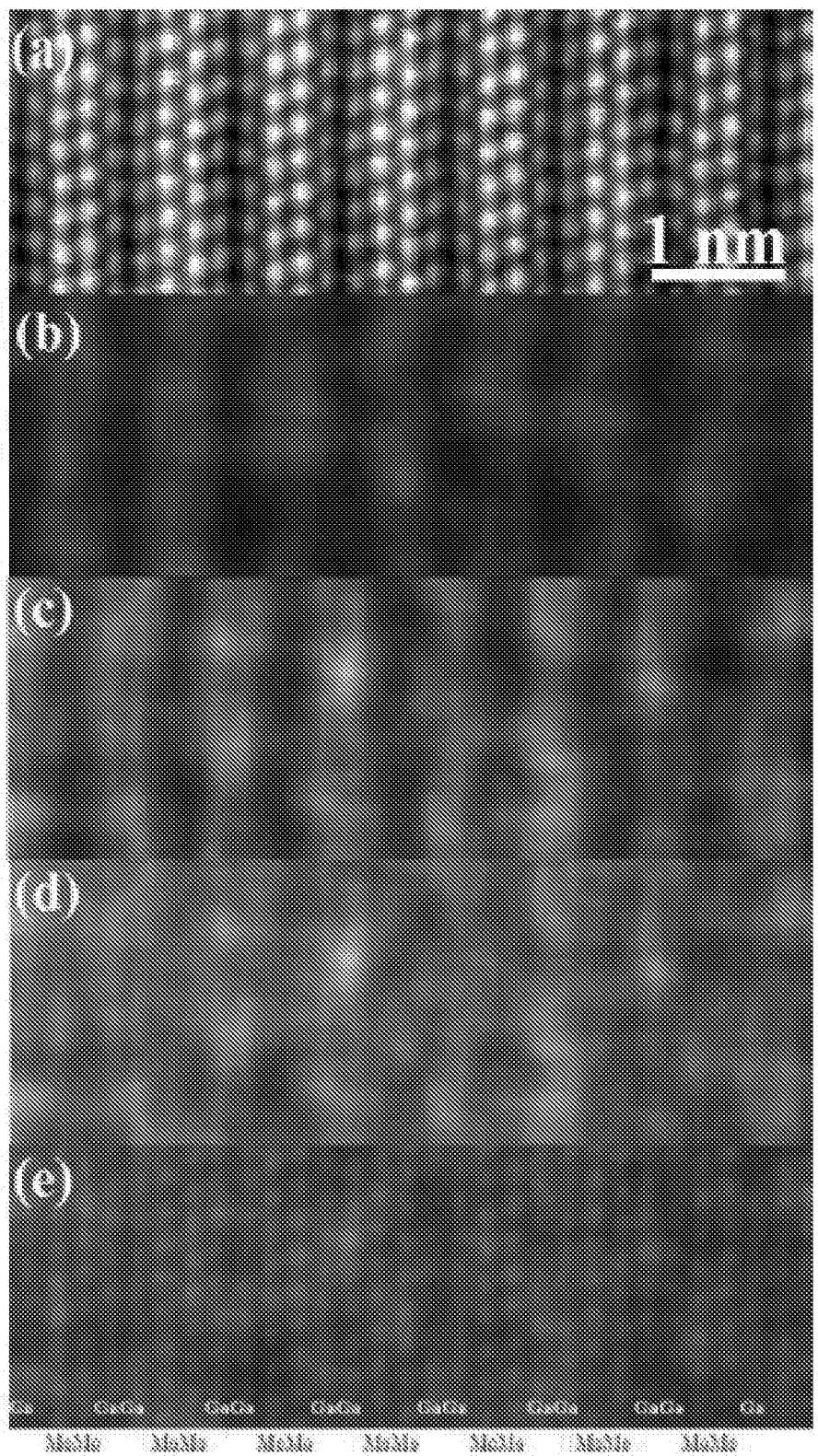

NANOLAMINATED 2-2-1 MAX-PHASE COMPOSITIONS

CROSS-REFERENCE TO RELATED APPLICATIONS

This application is the National Stage Application of International Patent Application No. PCT/US2016/020216, filed Mar. 1, 2016, which claims priority to U.S. Patent Application Ser. No. 62/127,907, filed Mar. 4, 2015, the contents of which are incorporated by reference herein in their entireties for all purposes.

GOVERNMENT RIGHTS

This invention was made with government support under Contract No. DMR-1310245 awarded by the National Science Foundation. The government has certain rights in the invention.

TECHNICAL FIELD

The present invention is directed to new nanolaminated 2-2-1 MAX-phase compositions, and methods of making the same.

BACKGROUND

The ternary $M_{n+1}AX_n$, or MAX, phases (where M is an early transition metal, A is an A group element mostly groups 13 and 14, X is C and/or N, and n=1 to 3), phases are a large family, 70+, of nanolayered, machinable solids. There are approximately 50 $M_2AX$, or 211, phases, five $M_3AX_2$, or 312, phases and a growing number of $M_4AX_3$, of 413 phases since that structure was first established in $Ti_3AlN_4$. In all cases, the $M_{n+1}AX_n$ unit cells are hexagonal—space group P63/mmc—with two formula units per unit cell. In these compounds, near close-packed M atoms are interleaved with a single layer of pure A-element; the X atoms occupy the octahedral sites in between the M atoms. In the 211's, every third layer is an A-group element, in the 312's every fourth layer, and in the 413's every fifth.

These MAX phase carbides and nitrides possess unusual and, sometimes, unique chemical, physical, electrical, and mechanical properties that combine the best attributes of metals and ceramics such as high temperature wear, corrosion resistance, and toughness. The MAX phases are electrically and thermally conductive due to their metallic-like nature of bonding. Most of the known MAX phases are better electric and thermal conductors than Ti. Because of these properties, MAX phase materials are useful in technologies involving high efficiency engines, damage-tolerant thermal systems, increasing fatigue resistance, and retention of rigidity at high temperatures. New applications based on reported superconducting behavior at low temperatures has spawned new interest in these materials.

Within this class of materials, the first and only Mo-containing MAX phase, $Mo_2GaC$, was first synthesized in 1967 by reacting Mo and C powders with liquid Ga for four weeks at 850° C. in an evacuated quartz capsule. Superconducting behavior below 7 K has been reported. More recently a theoretical paper was published predicting some of its properties. Compared to $Nb_2GaC$ and $V_2GaC$, $Mo_2GaC$ was predicted to have the highest bulk shear modulus and lowest shear modulus.

The present disclosure addresses the interest in MAX-phase materials in their own right and as precursors to MX-ene materials, generally, and the promise of such interesting properties for new Mo-containing materials, specifically.

SUMMARY

The present disclosure is directed to a new class of materials, including those specifically comprising Mo, Ga, and C/N, which depart from the classical $M_{n+1}AX_n$ MAX phase structure.

Certain embodiments of the present invention include those crystalline solid having an empirical formula of $M_2A_2X$;

wherein M is at least one Group IIIB, IVB, VB, or VIB metal, preferably Cr, Hf, Sc, Ti, Mo, Nb, Ta, V, Zr, or a combination thereof;

wherein A is Al, Ga, Ge, In, Pb, or Sn, or a combination thereof; and each X is $C_xN_y$, where x+y=1.

In certain of these embodiments, the empirical formula is defined by the unit cell stoichiometry of the crystalline solid. Generally, the crystalline structure may be a simple hexagonal arrangement. In some of these embodiments, the 2-2-1 configurations are derived from two layers of Ga, In, or Sn atoms that are stacked between the corresponding $Cr_2C$, $Cr_2N$, $Hf_2C$, $Hf_2N$, $Mo_2C$, $Mo_2N$, $Nb_2C$, $Nb_2N$, $Sc_2C$, $Sc_2N$, $Ta_2C$, $Ta_2N$, $Ti_2C$, $Ti_2N$, $V_2C$, $V_2N$, $Zr_2C$, or $Zr_2N$ layers.

In specific embodiments, the crystalline solid has a unit cell stoichiometry of $Mo_2Ga_2C$. In some of these crystalline solids, two layers of Ga atoms are stacked between $Mo_2C$ layers.

One particular embodiment provides a crystalline solid comprising or consisting essentially of molybdenum, gallium, and carbon exhibiting at least five of the following characteristic X-ray powder diffraction peaks (Cu Kα radiation, expressed in degrees 2θ) at approximately 9.8, 34.1, 37.3, 42.5, 53.4, 61.0, and 75.4. Additional embodiments include solids that further exhibit other additional peaks shown in Table 1, preferably in order of decreasing intensities.

The crystalline solids described herein are useful in electrochemical applications, including anode for lithium ion and other batteries. In another embodiment, then the crystalline materials are configured so as to operate as such anodes. Stated another way, some embodiments are directed to anodes for lithium ion and other batteries comprising at least one of the crystalline compositions described herein.

BRIEF DESCRIPTION OF THE DRAWINGS

The following figures are presented as illustrative examples, and should not be considered to limit the scope of the invention in any way. Except where otherwise noted, the scales of the figures may be exaggerated for illustrative purposes.

DETAILED DESCRIPTION OF ILLUSTRATIVE EMBODIMENTS

Figure 1:
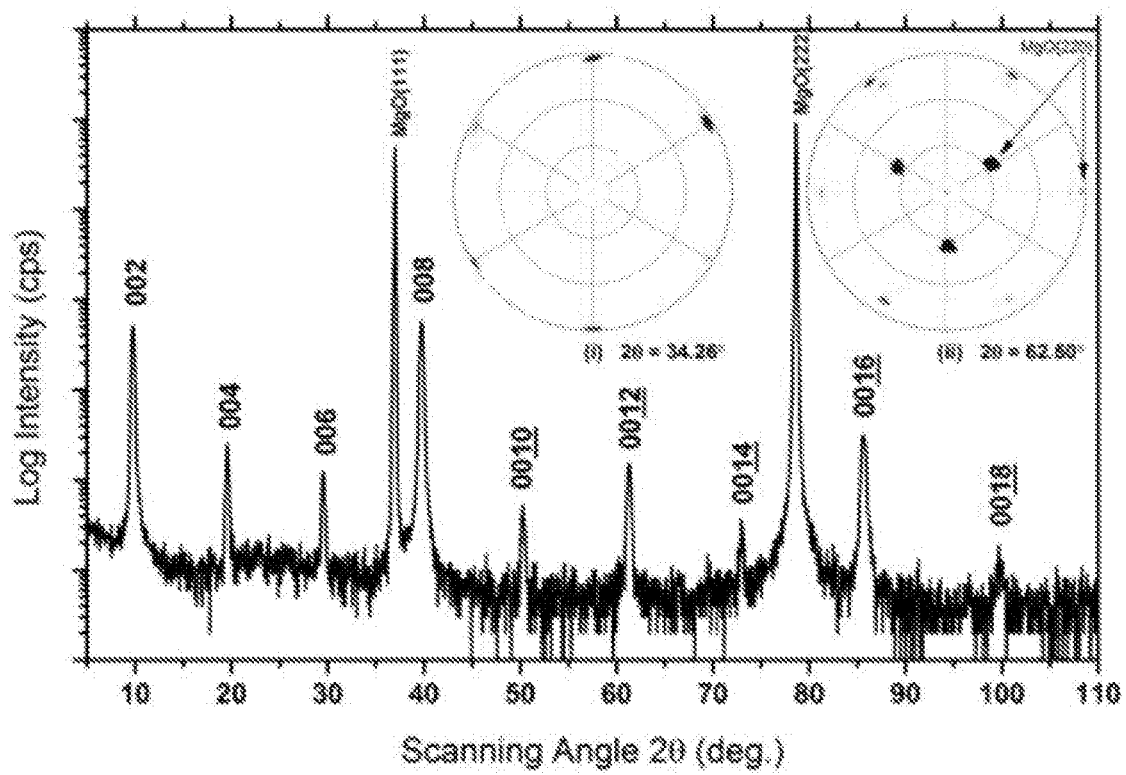
FIG. 1 is an XRD pattern of $Mo_2Ga_2C$ thin film sample. The two peaks with highest intensities at 2θ=36.97° and 78.64° are those of the MgO substrate. The other 9 peaks come from the thin film and represent a series of interplanar spacing d with a least common multiple of ~9.04 Å. The pole figure labelled (i) was acquired at a constant 2θ=34.26°—and one labelled (ii) was acquired at 2θ=62.50°.
Figure 1:
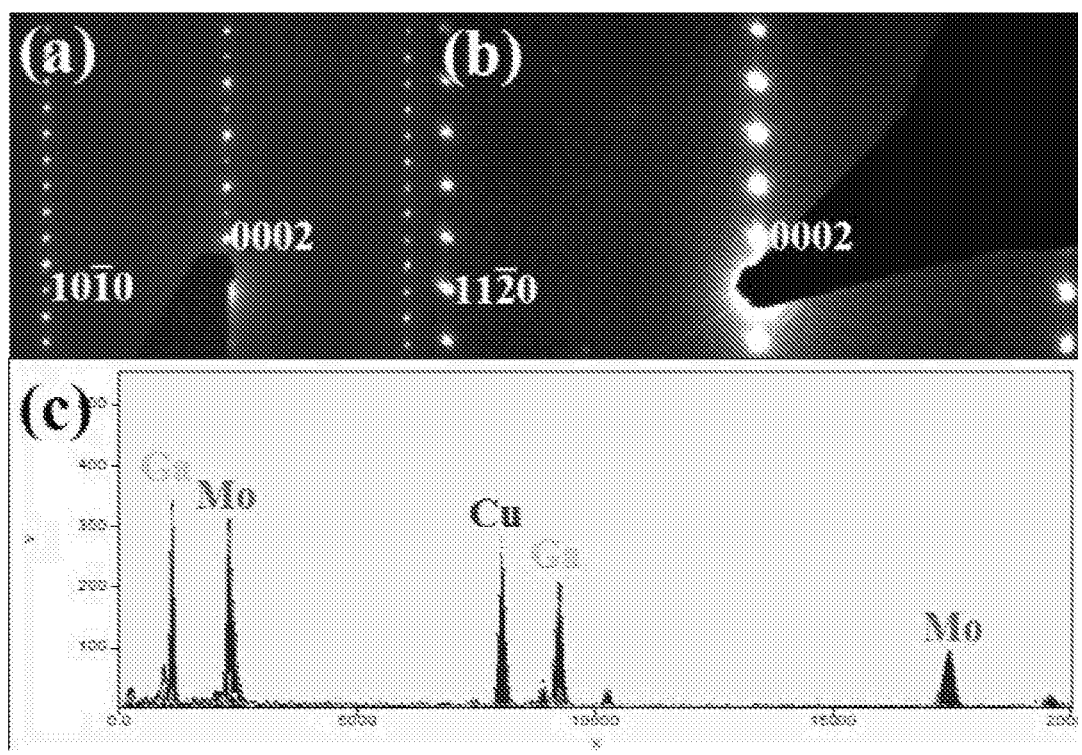

The present invention describes a new class of MAX-phase materials, these having the stoichiometry $M_2A_2$ $(C_xN_y)$, where x+y=1. $Mo_2Ga_2C$ is a particular embodiment within this class The present invention may be understood more readily by reference to the following detailed description taken in connection with the accompanying Figures and Examples, which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to compositions and to the articles and devices derived therefrom, as well as the methods of manufacture and use.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When values are expressed as approximations by use of the antecedent "about," it will be understood that the particular value forms another embodiment. In general, use of the term "about" indicates approximations that can vary depending on the desired properties sought to be obtained by the disclosed subject matter and is to be interpreted in the specific context in which it is used, based on its function, and the person skilled in the art will be able to interpret it as such. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, reference to values stated in ranges includes each and every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of" and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially of" For those embodiments provided in terms of "consisting essentially of" the basic and novel characteristic(s) is the novel structures described herein. For example, the term "consisting essentially of molybenum, gallium, and carbon" refers to a composition containing at least these elements, but the presence of any additional elements is insufficient to compromise the crystalline 2-2-1 structure of the $Mo_2Ga_2C$ MAX phase composition.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

Various embodiments of this invention provide for crystalline solids, each crystalline solid having an empirical formula of $M_2A_2X$.

wherein M is at least one Group IIIB, IVB, VB, or VIB metal, preferably Cr, Hf, Sc, Ti, Mo, Nb, Ta, V, Zr, or a combination thereof (more preferably Mo);

wherein A is Al, Ga, Ge, In, Pb, or Sn, or a combination thereof (preferably Ga); and each X is $C_xN_y$, where x+y=1.

As described herein, the terms "M" or "M atoms," "M elements," or "M metals" refers to one or more members of the Groups IIIB, IVB, VB, or VIB or (aka) Groups 3-6 of the periodic table, either alone or in combination, said members at least including Sc, Y, Lu, Ti, Zr, Hf, V, Nb, Ta, Cr, Mo, and W. The terms "M" or "M atoms," "M elements," or "M metals" may also include Mn. In preferred embodiments, the transition metal is one or more of Sc, Ti, Zr, Hf, V, Nb, Ta, Cr, and/or Mo. In even more preferred embodiments, the transition metal is Mo.

The range of compositions available can be seen as extending even further when one considers that each M-atom position within the overall $M_2A_2X$ matrix can be represented by more than one element. That is, one or more type of M-atom can occupy each M-positions within the respective matrices. In certain exemplary non-limiting examples, these can be $(M^A{}_xM^B{}_y)_2A_2C$ or $(M^A{}_xM^B{}_y)_2A_2N$, where $M^A$ and $M^B$ are independently members of the same chemical group (taken from the specific Group embodiments described elsewhere herein), and x+y=1. In the same way, one or more type of X-atom can occupy each X-position within the matrices, for example solid solutions of the formulae $M_2A_2(C_xN_y)$, or $(M^A{}_xM^B{}_y)_2A_2(C_xN_y)$, where x and y are independent at each occurrence and x+y=1.

Previously known MAX phase compositions having the general: $M_{n+1}AX_n$, (MAX) where n=1 to 3, are generally recognized as comprising layered, hexagonal carbides and nitrides, in which M is typically described as an early transition metal (comprising a Group IIIB, IVB, VB, or VIB metal, or Mn), A is described as an A-group (mostly IIIA and IVA, or groups 13 and 14) element and X is either carbon and/or nitrogen. See, e.g., M. W. Barsoum, et al., "Synthesis and Characterization of a Remarkable Ceramic: $Ti_3SiC_2$," *J. Amer. Ceramics. Soc.*, 79, 1953-1956 (1996); M. W. Barsoum, "The $M_{N+1}AX_N$ Phases: A New Class of Solids: Thermodynamically Stable Nanolaminates,"*Progress in Solid State Chemistry*, 28, 201-281 (2000), both of which are incorporated by reference herein. While $Ti_3AlC_2$ is among the most widely studied of these materials, more than 60 MAX phases are currently known to exist and are useful in the present invention.

While the present disclosure describes the specific features of $Mo_2Ga_2C$, as the exemplary 2-2-1 MAX phase material, it is expected that these 2-2-1 crystalline solids also may include one or more of $Cr_2Ga_2C$, $Cr_2Ga_2N$, $Mo_2Ga_2N$, $Nb_2Ga_2C$, $Nb_2Ga_2N$, $Ta_2Ga_2C$, $Ta_2Ga_2N$, $Ti_2Ga_2C$, $Ti_2Ga_2N$, $V_2Ga_2C$, or $V_2Ga_2N$.

In other embodiments of the present invention, these 2-2-1 crystalline solids may include one or more of $Hf_2In_2C$, $Hf_2In_2N$, $Hf_2Sn_2C$, $Hf_2Sn_2N$, $Nb_2In_2C$, $Nb_2In_2N$, $Nb_2Sn_2C$, $Nb_2Sn_2N$, $Sc_2In_2C$, $Sc_2In_2N$, $Ti_2In_2C$, $Ti_2In_2N$, $Ti_2Sn_2C$, $Ti_2Sn_2N$, $Zr_2In_2C$, $Zr_2In_2N$, $Zr_2Sn_2C$, or $Zr_2Sn_2N$.

Again, while the presence of gallium in the $Mo_2Ga_2C$ described herein has been realized in practice, the close size relationship of other M and A element atoms support the inclusion of the other M and A elements in $M_2A_2X$ materials within the scope of the present invention.

| | Atomic Radius, pm | MAX Phase material? |
|---|---|---|
| A-Element | | |
| Aluminum | 118 | Yes |
| Germanium | 125 | Yes |
| Astatine | 127 | Yes |
| Gallium | 136 | Yes |
| Tin | 145 | Yes |
| Lead | 154 | Yes |
| Indium | 156 | Yes |
| Thallium | 156 | Yes |
| M-Element | | |
| Chromium | 166 | Yes |
| Vanadium | 171 | Yes |
| Titanium | 176 | Yes |
| Scandium | 184 | Yes |
| Molybdenum | 190 | Yes |
| Niobium | 198 | Yes |
| Tantalum | 200 | Yes |
| Zirconium | 206 | Yes |
| Hafnium | 208 | Yes |

Generally, previously known $M_{n+1}AX_n$ phase materials are themselves known to exist as laminated structures with anisotropic properties. These materials are layered hexagonal (space group P6$_3$/mmc), with two formula units per unit cell. Such also appears to be the case with these new 2-2-1 MAX phase materials. Near close-packed M-layers are interleaved with pure A-group element layers, with the X-atoms filling the octahedral sites between the former. In the case of the 2-2-1 materials, the near close packed M-layers are interleaved with two A-group element layers. Accordingly, in certain embodiments, the 2-2-1 materials have structures characterized as comprising two layers of Ga, In, or Sn atoms stacked between the corresponding $Cr_2C$, $Cr_2N$, $Hf_2C$, $Hf_2N$, $Mo_2C$, $Mo_2N$, $Nb_2C$, $Nb_2N$, $Sc_2C$, $Sc_2N$, $Ta_2C$, $Ta_2N$, $Ti_2C$, $Ti_2N$, $V_2C$, $V_2N$, $Zr_2C$, or $Zr_2N$ layers or mixed metal layers of TiZrC, TiZrN, TiHfC, TiHfN, ZrHfC, ZrHfN CrMoC, CrMoC, VTaC, VTaN, VNbC, VNbN, TaNbC, or TaNbN. This is demonstrated specifically for $Mo_2Ga_2C$, where two layers of Ga atoms are stacked between $Mo_2C$ layers, the structure exhibiting a simple hexagonal arrangement.

These 2-2-1 MAX-phase materials can also be characterized by their X-ray diffraction (XRD) spectra (see FIG. 1 and Table 1). For example, certain embodiments provide crystalline solids comprising or consisting essentially of molybdenum, gallium, and carbon exhibiting at least five of the following characteristic X-ray powder diffraction peaks (Cu Kα radiation, expressed in degrees 2θ) at approximately 9.8, 19.6, 29.6, 39.9, 50.4, 61.5, 73.2, 86.0, and 100.2. Additional embodiments include solids that further exhibit other additional peaks shown in FIG. 1, preferably in order of decreasing intensities. Other embodiments provide crystalline solids comprising or consisting essentially of molybdenum, gallium, and carbon exhibiting at least five of the following characteristic X-ray powder diffraction peaks (Cu Kα radiation, expressed in degrees 2θ) at approximately 9.8, 34.1, 37.3, 42.5, 53.4, 61.0, and 75.4, and optionally other additional peaks shown in Table 1, preferably in order of decreasing intensities.

The following listing of embodiments is intended to complement, rather than displace or supersede, the previous descriptions.

Embodiment 1

A crystalline solid having an empirical formula of $M_2A_2X$.

wherein M is at least one Group IIIB, IVB, VB, or VIB metal, preferably Cr, Hf, Sc, Ti, Mo, Nb, Ta, V, Zr, or a combination thereof.

wherein A is Al, Ga, Ge, In, Pb, or Sn, or a combination thereof and each X is $C_xN_y$, where x+y=1.

Embodiment 2

The crystalline solid of Embodiment 1 that is $Cr_2Ga_2C$, $Cr_2Ga_2N$, $Mo_2Ga_2C$, $Nb_2Ga_2C$, $Ta_2Ga_2C$, $Ti_2Ga_2C$, $Ti_2Ga_2N$, $V_2Ga_2C$, or $V_2Ga_2N$.

Embodiment 3

The crystalline solid of Embodiment 1 that is $Hf_2In_2C$, $Hf_2In_2N$, $Hf_2Sn_2C$, $Hf_2Sn_2N$, $Nb_2In_2C$, $Nb_2In_2N$, $Nb_2Sn_2C$, $Nb_2Sn_2N$, $Sc_2In_2C$, $Sc_2In_2N$, $Ti_2In_2C$, $Ti_2In_2N$, $Ti_2Sn_2C$, $Ti_2Sn_2N$, $Zr_2In_2C$, $Zr_2In_2N$, $Zr_2Sn_2C$, or $Zr_2Sn_2N$.

Embodiment 4

The crystalline solid of any one of Embodiments 1 to 3, wherein the empirical formula is defined by the unit cell stoichiometry of the crystalline solid.

Embodiment 5

The crystalline solid of Embodiment 1, having a unit cell stoichiometry of $Mo_2Ga_2C$.

Embodiment 6

The crystalline solid of any one of Embodiments 1 to 5, in which two layers of Ga, In, or Sn atoms are stacked between the corresponding $Cr_2C$, $Cr_2N$, $Hf_2C$, $Hf_2N$, $Mo_2C$, $Mo_2N$, $Nb_2C$, $Nb_2N$, $Sc_2C$, $Sc_2N$, $Ta_2C$, $Ta_2N$, $Ti_2C$, $Ti_2N$, $V_2C$, $V_2N$, $Zr_2C$, or $Zr_2N$ layers.

Embodiment 7

The crystalline solid of Embodiment 5, in which two layers of Ga atoms are stacked between otherwise adjacent $Mo_2C$ layers.

Embodiment 8

The crystalline solid of any one of Embodiments 1 to 7, wherein the crystalline structure is arranged in a simple hexagonal arrangement.

Embodiment 9

A crystalline solid comprising or consisting essentially of molybdenum, gallium, and carbon exhibiting at least five of the following characteristic X-ray powder diffraction peaks (Cu Kα radiation, expressed in degrees 2θ) at approximately 9.8, 19.6, 29.6, 39.9, 50.4, 61.5, 73.2, 86.0, and 100.2 and optionally other additional peaks shown in FIG. 1, preferably in order of decreasing intensities.

Embodiment 10

A crystalline solid comprising or consisting essentially of molybdenum, gallium, and carbon exhibiting at least five of the following characteristic X-ray powder diffraction peaks (Cu Kα radiation, expressed in degrees 2θ) at approximately 9.8, 34.1, 37.3, 42.5, 53.4, 61.0, and 75.4 and other additional peaks shown in Table 1, preferably in order of decreasing intensities.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein.

In the following examples, efforts have been made to ensure accuracy with respect to numbers used (e.g. amounts, temperature, etc.) but some experimental error and deviation should be accounted for. Unless indicated otherwise, temperature is in degrees C., pressure is at or near atmospheric.

Example 1: Experimental Details

In an effort to synthesize $Mo_2GaC$, an XRD peak around 9° 2θ suggested the possible existence of $Mo_3GaC_2$. However, since the latter is predicted to be highly unstable, further work described herein, led to the present discovery of a new phase: $Mo_2Ga_2C$, wherein two Ga layers—instead of one in $Mo_2GaC$ and all other MAX phases—are stacked in a simple hexagonal arrangement in between $Mo_2C$ layers.

Example 1.1. Synthesis of the Bulk $Mo_2Ga_2C$

The starting materials used were commercial Mo (63 NS, Metco Inc., Anderson, S.C.), graphite (Grade 4827, Asbury Graphite Mills Inc., Asbury, N.J.) powders and Ga shots (99.99%) (Roto Metals Inc., San Leandro, Calif.). First the Mo and graphite powders were weighed in a 2:1 molar ratio and placed in a plastic bottle and mixed for 24 h using agate balls as the milling media. This mixture was then mixed with the Ga shot in an agate mortar.

Bulk $Mo_2Ga_2C$ samples were synthesized by, first heating a 2:1 molar ratio of Mo:C powders in flowing Ar at 1000° C. for 12 h. The resulting, lightly sintered, Mo2C compact was crushed into a powder and mixed with Ga in 1:1 molar ratio. This mixture was then sealed under a mechanical vacuum in a 100 mm long quartz tube, and sintered at 850° C. for 24 h. XRD diffraction patterns of the resulting material showed the presence of significant amounts of unreacted Ga. To dissolve the latter, the powders were immersed in 37% HCl for 4 days.

Example 1.2. Alternate Method for Synthesizing Bulk $Mo_2Ga_2C$

Powders of $Mo_2Ga_2C$ were synthesized by a solid liquid reaction of $Mo_2C$ and Ga. In brief, a −325 mesh $Mo_2C$ powder and Ga (both from Alfa Aesar, Ward Hill, Mass., both of 99.5 wt % purity) were mixed in a 1:8 molar ratio and placed in a quartz tube that was evacuated using a mechanical vacuum pump and sealed. The latter was placed in a horizontal tube furnace that was heated at a rate of 10° C. min$^{-1}$ to 850° C., and held at that temperature for 48 h. After furnace cooling, the lightly sintered material was crushed, using a mortar and pestle, and returned back to the quartz tube. The latter was evacuated and re-heated at a rate of 10° C. min$^{-1}$ to 850° C. and held at temperature for 16 h more. Rietveld refinement of the XRD patterns for $Mo_2Ga_2C$ indicated that <20 wt % $Mo_2C$ was present in the powders as a secondary phase.

One gram of the lightly sintered $Mo_2Ga_2C$ compact was immersed in a 20 mL of 12 M HCl solution (technical grade, Fisher Scientific, Fair Lawn, N.J.) for 2 d, at RT, while being stirred using a Teflon coated magnet on a stir plate to dissolve any unreacted Ga. The powders were washed with DI water several times (until the pH of the wash water was ca. 6), then dried by filtration using a nanoporous polypropylene membrane.

Example 1.3. Removal of Gallium from $Mo_2Ga_2C$ to Form $Mo_2CT_x$ Flakes—Method 1

One gram of $Mo_2Ga_2C$ powder was added to 20 mL of a premixed solution of 3 M of LiF (90+%, Ward Hill, Mass., Alfa Aesar) and 12 M HCl. The $Mo_2Ga_2C$ containing mixture was placed on a magnetic stirrer hot plate in an oil bath held at 35° C. for various times. Afterwards, the mixture was washed through three cycles of 1 M of aqueous HCl, followed by three cycles of 1 M of aqueous LiCl (Alfa Aesar, 98+%), and finally cycles of DI water until the supernatant reached a pH of approximately 6. In each cycle, the washing was performed by adding 40 mL volume of the solution to the washed powders in a centrifuge tube, and the tube was hand-shaken for 1 min before centrifuging at 5000 rpm for 2 min. 20 mL of argon, Ar, deaerated DI water were then added to the washed powder, which was then hand shaken for 5 min., followed by centrifuging for 1 h at 5000 rpm. The supernatant was collected for further investigation. The settled powder was discarded. The product was characterized to be a MXene composition of $Mo_2CT_x$ (i.e., a 2-D lattice having a unit cell composition of $Mo_2C$ where $T_x$ represents surface terminations of each crystal lattice layer, predominantly by O and OH) intercalated by lithium ions. In this way, the $Mo_2Ga_2C$ responded to this treatment with LiCl and HCl in much the same way as previously observed for extracting aluminum from MAX phase analogs.

Example 1.3. Removal of Gallium from $Mo_2Ga_2C$ to Form $Mo_2CT_x$ Flakes—Method 2

Powders of $Mo_2Ga_2C$ were immersed, slowly, in a bottle containing 14 M aqueous HF (Fisher Scientific, Fair Lawn, N.J.) in a ratio of 1 g to 40 mL. Afterwards the bottle was placed in an oil bath over a stirred hot plate held at 55° C. for 160 h, while stirring using a Teflon coated magnet. The resulting suspension was washed with DI water through several cycles till a pH of ca. 6 was reached. In each cycle, the washing was performed by adding 40 mL of DI water to a centrifuge tube containing the sediment, and then the tube was hand-shaken for 1 min before centrifuging at 5000 rpm for 2 min. The settled powder was removed from the centrifuge tube and filtered through a nanoporous polypropylene membrane (3501 Coated PP, 0.064 micron pore size, Celgard) for further investigation.

One gram of this filtered powder was added to a 10 mL of an aqueous solution of 54-56 wt % tetrabutylammonium hydroxide, $(C_4H_9)_4NOH$, (Sigma Aldrich, St. Louis, Mo.). The mixture was stirred at RT for 18 h. After the prescribed mixing time, the mixture was washed three times by 40 mL deaerated DI water each time and the sediment was used for further characterization and delamination.

Example 1.5. Thin Film Synthesis

Direct current magnetron sputtering was used to grow Mo—Ga—C thin films were synthesized. The films were co-deposited from three elemental targets, Mo (3-inch, 99.95% purity, SCOTECH Ltd.), Ga (2-inch, 99.99999% purity, 5N Plus UK Ltd.) and C (3-inch, 99.99% purity, SCOTECH Ltd.) with respective powers 40 W, 18 W and 200 W and at ~0.5 Pa Ar with a background pressure in the range of 10-7 Pa. Due to its low melting point (~30° C.), the Ga source was kept in a concave stainless steel crucible right below the substrate, in line with previously developed procedures. The Mo and C targets were tilted +35° and −35° away from the horizontal position of the Ga target, co-focusing onto the rotating substrate.

The thin films were grown on MgO (111) substrates (10×10×0.5 $mm^3$, Latech Ltd.) that were ultrasonically cleaned sequentially in acetone, ethanol and isopropanol for 10 minutes at each stage. Before deposition, the substrate was heated to 560° C. at the base pressure, followed by a 10 minutes presputtering with the same powers for deposition. A shutter was inserted to blind the substrate from the target's line-of-sight when pre-sputtering, and was afterwards removed directly to start the deposition at the same substrate temperature set-point (560° C.).

Example 2. Characterization Details

Example 2.1. Details of XRD Experimental Parameters and Refinement Conditions XRD patterns were obtained with a diffractometer (Rikagu Smartlab, Tokyo, Japan), with a step size of 0.02° in the 3°-120° 2 theta range with a step time of 7 s with a 10×10 $mm^2$ window slit. Scans were made with Cu-Kα radiation (40 kV and 44 mA).

Rietveld refinement of the XRD diffractograms was carried out using the FULLPROF code [J. Rodriguez-Carvajal, Phys. B 192 (1993) 55-69]. The refinement was carried out from 8.5° to 120° 2θ. Refined parameters were: five background parameters, scale factors from which relative phase fractions are evaluated, Y profile parameter for peak width, lattice parameters (LPs) and atomic positions for all phases. The experimental and those calculated from the Rietveld refinement are summarized in Table 1.

TABLE 1

X-ray (Cu Kα) powder diffraction data for $Mo_2Ga_2C$.

| Peak Number | h | k | l | 2theta | I calculated | I observed | d-hkl |
|---|---|---|---|---|---|---|---|
| 1 | 0 | 0 | 2 | 9.778 | 539.2 | 595.1 | 9.038692 |
| 2 | 0 | 0 | 4 | 19.627 | 12.8 | 0 | 4.519346 |
| 3 | 0 | 0 | 6 | 29.626 | 9 | 5.4 | 3.012897 |
| 4 | 1 | 0 | 0 | 34.078 | 752.1 | 600 | 2.628786 |
| 5 | 1 | 0 | 1 | 34.448 | 111.7 | 87.2 | 2.601424 |
| 6 | 1 | 0 | 2 | 35.536 | 8.9 | 26.6 | 2.524197 |
| 7 | 1 | 0 | 3 | 37.289 | 1745.8 | 1612.5 | 2.409481 |
| 8 | 1 | 0 | 4 | 39.631 | 18.4 | 17.5 | 2.272329 |
| 9 | 0 | 0 | 8 | 39.862 | 661.3 | 741.6 | 2.259673 |
| 10 | 1 | 0 | 5 | 42.482 | 1469.5 | 1393.4 | 2.126176 |
| 11 | 1 | 0 | 6 | 45.77 | 14.5 | 85.8 | 1.980804 |
| 12 | 1 | 0 | 7 | 49.433 | 98.6 | 103.8 | 1.842244 |
| 13 | 0 | 0 | 10 | 50.442 | 7.3 | 6.8 | 1.807738 |
| 14 | 1 | 0 | 8 | 53.426 | 471.5 | 503.4 | 1.7136 |
| 15 | 1 | 0 | 9 | 57.715 | 2 | 0 | 1.596029 |
| 16 | 1 | 1 | 0 | 60.999 | 617.9 | 522.7 | 1.51773 |
| 17 | 0 | 0 | 12 | 61.505 | 13.5 | 12.9 | 1.506449 |
| 18 | 1 | 1 | 2 | 61.946 | 24.7 | 21.8 | 1.496776 |
| 19 | 1 | 0 | 10 | 62.281 | 11.7 | 9.9 | 1.489534 |
| 20 | 1 | 1 | 4 | 64.74 | 4 | 0 | 1.438764 |
| 21 | 1 | 0 | 11 | 67.115 | 230.1 | 182.8 | 1.393502 |
| 22 | 1 | 1 | 6 | 69.262 | 6.6 | 3.4 | 1.355463 |
| 23 | 2 | 0 | 0 | 71.754 | 84 | 53.4 | 1.314393 |
| 24 | 2 | 0 | 1 | 71.973 | 11.2 | 7.8 | 1.310932 |
| 25 | 1 | 0 | 12 | 72.22 | 7.6 | 7 | 1.307045 |
| 26 | 2 | 0 | 2 | 72.628 | 1.7 | 1.2 | 1.300712 |
| 27 | 0 | 0 | 14 | 73.247 | 1.7 | 1.6 | 1.291242 |
| 28 | 2 | 0 | 3 | 73.715 | 228.1 | 189.5 | 1.284197 |
| 29 | 2 | 0 | 4 | 75.227 | 2.2 | 2 | 1.262098 |
| 30 | 1 | 1 | 8 | 75.379 | 586.3 | 496.7 | 1.259917 |
| 31 | 2 | 0 | 5 | 77.155 | 244.3 | 208.9 | 1.235294 |
| 32 | 1 | 0 | 13 | 77.61 | 273.3 | 286.2 | 1.229188 |
| 33 | 2 | 0 | 6 | 79.492 | 3.1 | 6 | 1.204741 |
| 34 | 2 | 0 | 7 | 82.232 | 19.1 | 8.3 | 1.171398 |
| 35 | 1 | 1 | 10 | 83.011 | 12.4 | 10.1 | 1.162377 |
| 36 | 1 | 0 | 14 | 83.309 | 0.8 | 0.3 | 1.158976 |
| 37 | 2 | 0 | 8 | 85.372 | 119.4 | 93.3 | 1.136165 |
| 38 | 0 | 0 | 16 | 85.965 | 68.7 | 76.4 | 1.129836 |
| 39 | 2 | 0 | 9 | 88.914 | 0.3 | 0 | 1.099836 |
| 40 | 1 | 0 | 15 | 89.358 | 25.6 | 0 | 1.09552 |

TABLE 1-continued

X-ray (Cu Kα) powder diffraction data for Mo$_2$Ga$_2$C.

| Peak Number | h | k | l | 2theta | I calculated | I observed | d-hkl |
|---|---|---|---|---|---|---|---|
| 41 | 1 | 1 | 12 | 92.183 | 26.6 | 30.9 | 1.069186 |
| 42 | 2 | 0 | 10 | 92.868 | 4.7 | 4.7 | 1.063088 |
| 43 | 1 | 0 | 16 | 95.818 | 75.3 | 80.9 | 1.038023 |
| 44 | 2 | 0 | 11 | 97.256 | 100.1 | 98.3 | 1.026468 |
| 45 | 0 | 0 | 18 | 100.17 | 3.6 | 4.2 | 1.004299 |
| 46 | 2 | 1 | 0 | 101.658 | 81.1 | 69.6 | 0.993588 |
| 47 | 2 | 1 | 1 | 101.871 | 7.7 | 6.7 | 0.99209 |
| 48 | 2 | 0 | 12 | 102.112 | 3.6 | 3.8 | 0.990402 |
| 49 | 2 | 1 | 2 | 102.509 | 2.6 | 3.9 | 0.987638 |
| 50 | 1 | 0 | 17 | 102.779 | 3.5 | 5.3 | 0.985778 |
| 51 | 1 | 1 | 14 | 103.116 | 8.1 | 12.3 | 0.983473 |
| 52 | 2 | 1 | 3 | 103.577 | 243.4 | 226.4 | 0.98035 |
| 53 | 2 | 1 | 4 | 105.081 | 2.4 | 4.4 | 0.970412 |
| 54 | 2 | 1 | 5 | 107.029 | 287.4 | 254.9 | 0.958068 |
| 55 | 2 | 0 | 13 | 107.494 | 161.1 | 148.3 | 0.955211 |
| 56 | 2 | 1 | 6 | 109.439 | 5.7 | 17.2 | 0.943602 |
| 57 | 1 | 0 | 18 | 110.383 | 3.3 | 6.7 | 0.938166 |
| 58 | 2 | 1 | 7 | 112.335 | 20.7 | 15.1 | 0.927322 |
| 59 | 2 | 0 | 14 | 113.494 | 1.1 | 0.2 | 0.921122 |
| 60 | 2 | 1 | 8 | 115.752 | 180.3 | 136.6 | 0.909545 |
| 61 | 1 | 1 | 16 | 116.411 | 317.9 | 288.6 | 0.906289 |
| 62 | 0 | 0 | 20 | 116.908 | 7.8 | 7.1 | 0.903869 |
| 63 | 1 | 0 | 19 | 118.859 | 74.3 | 57.1 | 0.894647 |
| 64 | 2 | 1 | 9 | 119.75 | 0.2 | 0.1 | 0.890583 |

Example 2.2. TEM, XRD and Structural Characterization

The TEM specimens were prepared by mechanic polishing followed by ion thinning down to electron transparency. High resolution scanning electron microscopy (HRSTEM) and X-ray energy dispersive spectroscopy (EDX) were performed with a double Cs corrected FEI Titan3 60-300 operated at 300 kV, equipped with the Super-X EDX system. Selected area electron diffraction (SAED) characterization was carried out using a FEI Tecnai G2 TF20 UT instrument operated at 200 kV with a point resolution of 0.19 nm. Structural characterization of the thin films was performed through X-ray diffraction (XRD). The system utilized was a Panalytical Empyrean MRD with a Cu Kα source. The measurements performed were symmetric (θ-2θ) scans obtained by employing a hybrid mirror and a 0.27° parallel plate collimator in the incident and the diffracted beam side, respectively.

Example 3. Discussion

The new phase compositions may be produced in two forms: thin film and bulk. In the case of the presently described Mo$_2$Ga$_2$C, the thin films were grown by direct current magnetron sputtering of elemental targets on MgO (111) substrates. Bulk Mo$_2$Ga$_2$C samples were synthesized by, first heating a 2:1 molar ratio of Mo:C powders in flowing Ar at 1000° C. for 12 h. The resulting, lightly sintered, Mo$_2$C compact was crushed into a powder and mixed with Ga in 1:1 molar ratio. This mixture was then sealed under a mechanical vacuum in a 100 mm long quartz tube, and sintered at 850° C. for 24 h. XRD diffraction patterns of the resulting material showed the presence of significant amounts of unreacted Ga. To dissolve the latter, the powders were immersed in 37% HCl for 4 days.

The morphologies of all phases resulting from the bulk form were imaged in a scanning electron microscope (SEM) (Supra 50VP, Carl Zeiss AG, Germany) equipped with an energy dispersive spectroscope (EDS). X-ray diffraction, XRD, patterns of the resulting powders were obtained using a diffractometer (see Examples for details). High resolution scanning electron microscopy (HRSTEM) and X-ray energy dispersive spectroscopy (EDX) were performed with a double Cs corrected FEI Titan3 60-300 operated at 300 kV, equipped with the Super-X EDX system. Selected area electron diffraction (SAED) characterization was carried out using a FEI Tecnai G2 TF20 UT instrument operated at 200 kV with a point resolution of 0.19 nm.

FIG. 1 shows a θ-2θ XRD pattern of a thin film sample, where the two peaks with highest intensities at 2θ=36.97° and 78.64° can be assigned (111) and (222) diffractions, respectively, of the MgO substrate. The other nine peaks originate from phases in the thin film with a d spacing with a least common multiple of ~9.04 Å. The insets in FIG. 1, shows two XRD pole figures of the thin film sample acquired respectively at constant 2θ=34.26° (inset (i) in FIG. 1B) and 62.50° (inset (ii) in FIG. 1. At 2θ=34.26°, six poles can be seen at Ψ=87-90° with 60° separations in between, which shows a sixfold symmetry in the in-plane directions with respect to the sample surface. This symmetry can be assigned to a phase from the thin film with an in-plane d spacing of ~2.62 Å. At 2θ=62.50°, three poles can be seen at Ψ=33-39° with 120° separations in between, while two groups of six poles with 60° separations in between are observed at Ψ=81° and Ψ=87-90°, respectively. The poles at Ψ=33-39° and 87-90° are assigned to MgO {220} from the MgO (111) substrate, which has a threefold rotational axis along MgO[111]. The sixfold symmetric poles at Ψ=81° can be assigned to a phase oriented in accordance with the in-plane orientation of the substrate, i.e. it is epitaxially grown on the MgO substrate.

FIGS. 2(A) and (B) are SAED patterns from the new compound. The phase has a hexagonal structure with a and c lattice parameters of 3.05 Å and 18.19 Å, respectively. The possibility that those patterns originate from a 312 MAX structure (i.e., the hypothetical Mo$_3$GaC$_2$ which is not stable) can be excluded for the following reasons. As noted above, the chemical composition analysis shown in FIG. 2(C) exhibits a different Mo/Ga ratio from that of Mo$_3$GaC$_2$ phase. The structure is also not that of Ta$_2$S$_2$C and Nb$_2$S$_2$C phases, which have the same or at least similar "221" stoichiometries, since they belong to the space group R-3m. Furthermore the stacking observed in HRSTEM (below), is inconsistent with either of these sulphides or a 312 MAX phase.

Figure 2D:
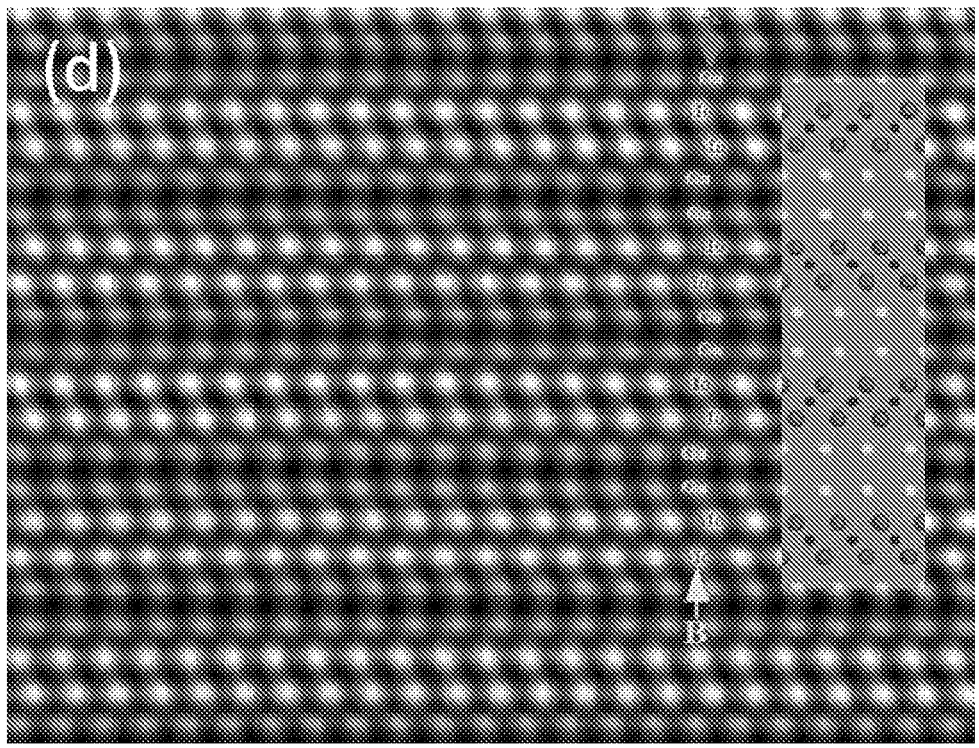
FIG. 2 illustrates (A) Selected area electron diffraction of $Mo_2Ga_2C$ thin films in [11$\bar{2}$0] and, (B) [1010] zone axes, (C) EDS spectrum; (D) high-angle annular dark field (HAADF) images in the (D) [11$\bar{2}$0] and, (E) [1010] zone axes. Insets are corresponding atomic structure models of indicating corresponding positions of Ga and Mo atoms in the stacking sequence
Figure 2E:
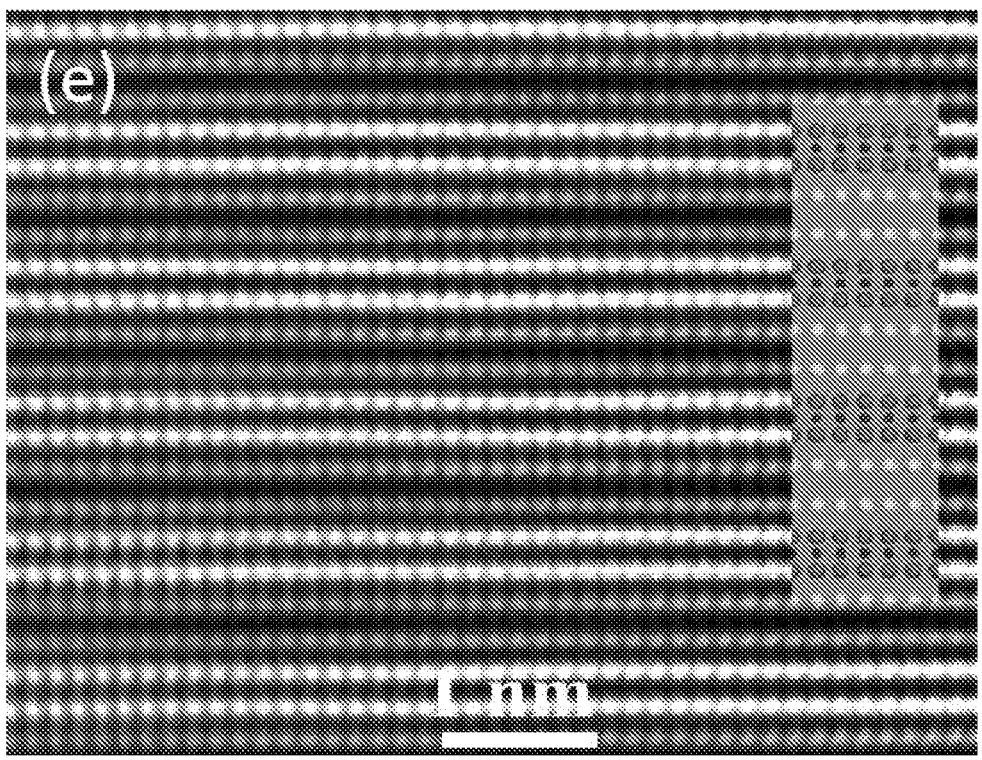

To reveal the detailed structure, Z contrast image was carried out by HRSTEM. FIG. 2(C) and FIG. 2(D) show HRSTEM images with the beam aligned along the [1120] and [1010] zone axes, respectively. The Z contrast images show a double-layer structural feature. The bright and dark spots should correspond to the Mo and Ga atoms, respectively.

Figure 3F:
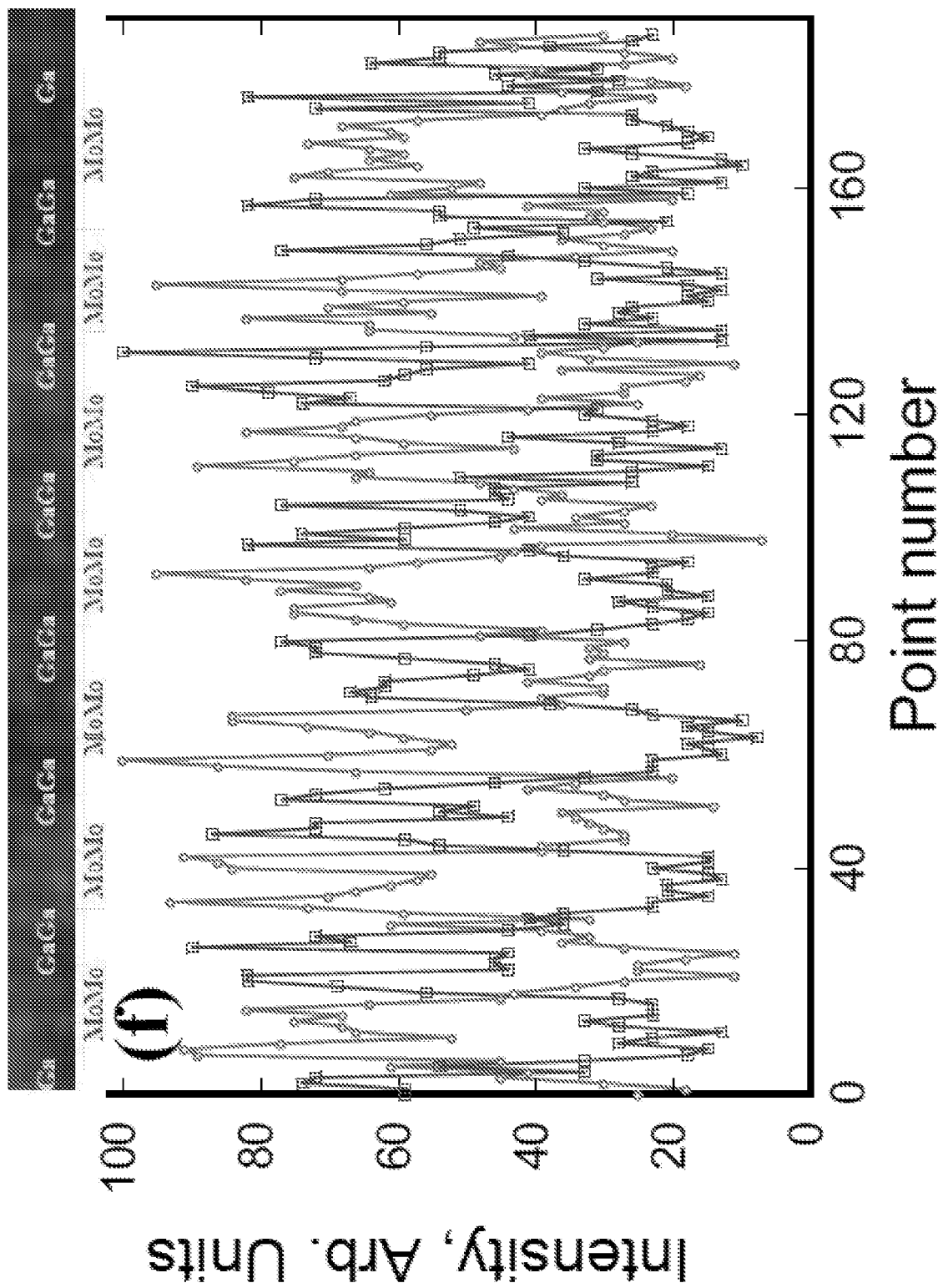
FIG. 3 illustrates (A) HAADF image and corresponding (B), Mo, (C) Ga, and, (D) Mo and Ga maps, (E) HAADF image superimposed with Mo and Ga maps, (F) line scan along [0001] direction a $Mo_2Ga_2C$ film (Ga, square points and Mo, circle points).

The corresponding EDX maps shown in FIG. 3(A-F) confirm the Mo—Mo—Ga—Ga—Mo—Mo layering. The simplest description of the structure is the following: Start with a 211 MAX phase structure and simply insert one extra Ga layer on top of the existing Ga. Surprisingly, the two Ga layer lie exactly on top of each other (i.e. not close-packed), an unusual arrangement indeed. Indeed this stacking structure is further supported by the facile way in which Mo$_2$Ga$_2$C is convertible to Mo$_2$C MXene with the removal of Ga. See Examples 1.3 and 1.4.

Based on the Z-contrast images, the distance between adjacent Mo layers was estimated to be 2.27 Å. The separation width between the Mo and Ga layers is shortest: 2.09 Å. The same stacking position of the two adjacent Ga layers leads a large separation width. The separation width between the adjacent Ga layers is about 2.64 Å. Based on the measured data, initial atomic positions of Mo and Ga are found and used as input data to the Rietveld refinement below.

Figure 4:
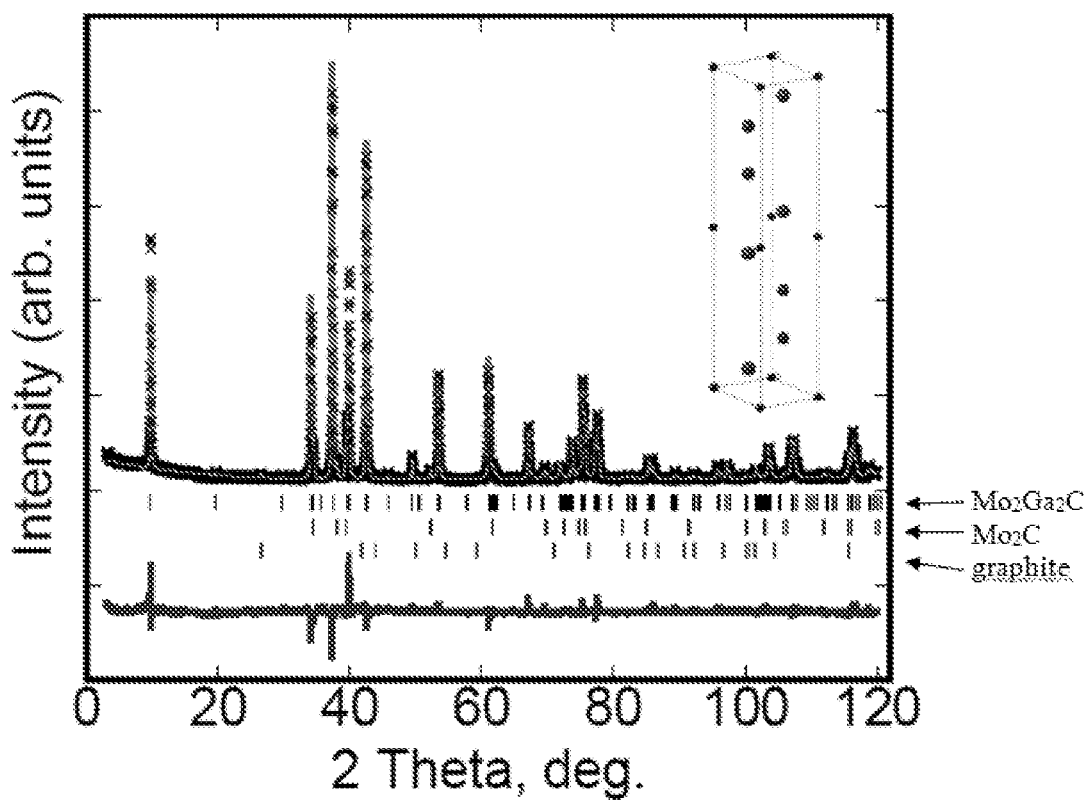
FIG. 4 illustrates are powder XRD patterns indexed to $Mo_2Ga_2C$ showing observed pattern (black crosses), Rietveld generated pattern (red line) and difference between the two (blue line). The ticks below the pattern represent the peak positions of $Mo_2Ga_2C$ phase, $Mo_2C$ phase, and graphite phase, respectively. The $\chi 2$ value was 3.78. Inset shows schematic of unit cell.
Figure 5:
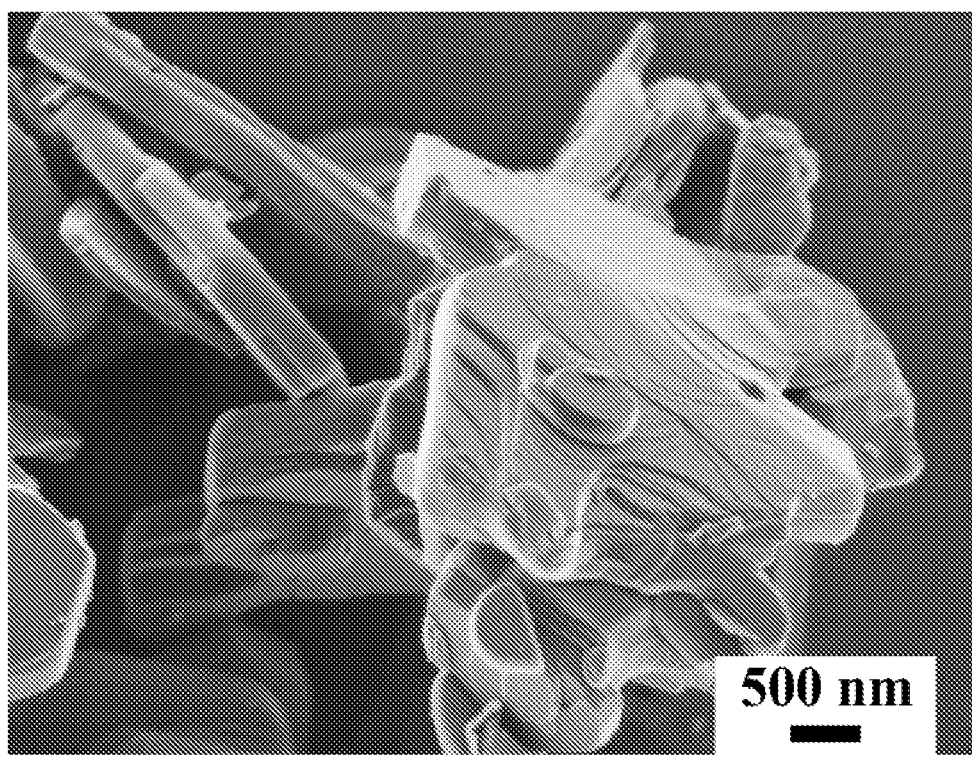
FIG. 5 is a scanning electron microscope micrograph of $Mo_2Ga_2C$ powders showing typical MAX phase platelet morphology
Figure 6:
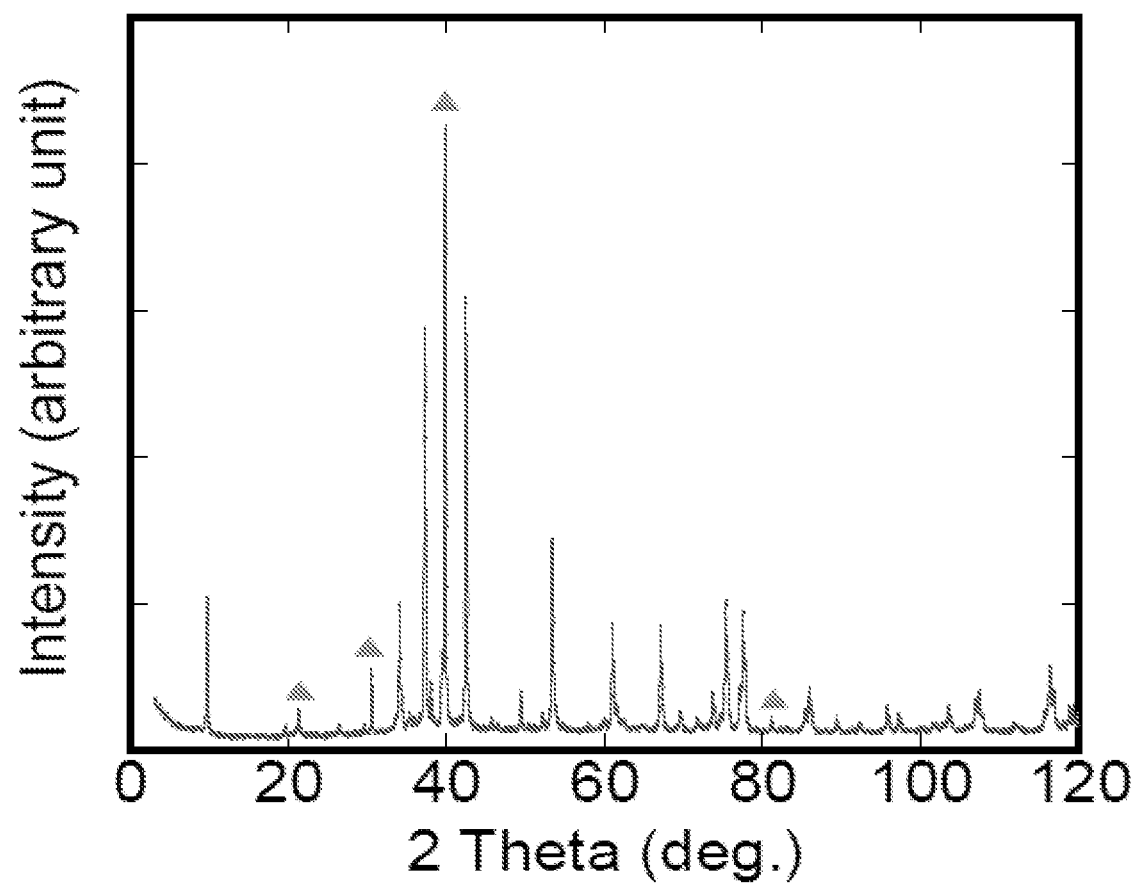
FIG. 6 is an XRD pattern of $Mo_2Ga_2C$ bulk sample, the triangle markers represent peaks for free gallium.

FIG. 4 shows a typical XRD pattern of the phase obtained after dissolving the unreacted Ga from the bulk sample. When this new phase was imaged in a HRSTEM (see above) its structure was found to be unlike any other MAX phase known in that there were two Ga layers separating the $Mo_2C$ blocks. Making use of this insight, the XRD pattern was analyzed assuming the unit cell shown in inset of FIG. 4.

To determine the composition of this new phase elastic recoil detection analysis (ERDA) was carried out on a close to phase pure thin film sample containing traces of Mo—C intermetallic phases, and the Mo, Ga and C contents, in at. %, were found to be, respectively, 38.9%, 42.5%, 18.3%, with a trace amount of oxygen. (0.34 at. %). The composition is consistent with 2:2:1 within the error margins of the technique.

The results of Rietveld analysis are summarized in Table 2. The space group assumed was that of the MAX phases: P63/mmc. The a and c-lattice parameters were calculated to be 3.03662(4) Å and 18.0855(3) Å, respectively. In addition to the $Mo_2Ga_2C$ phase, the Rietveld refinements indicated the presence of 7.35(0.16) wt. % $Mo_2C$ and 5.22(0.92) wt. % graphite. When these phases were taken into account, the $\chi 2$ value was 3.78. The occupancies were fixed to be 100% for Mo, Ga and C.

A list of the hkl indices of the various peaks—theoretical and experimentally observed—and their intensities and d spacings are listed in Table 1, which shows generally good agreement between theory and experiment. It should be noted here that since the simple hexagonal arrangement of the Ga atoms is somewhat unusual, other arrangements were tested, where the Ga layers were sheared with respect to each other. The $\chi 2$ values in those cases were significantly higher than for the unit cell shown in inset of FIG. 1(A).

TABLE 2

Atomic positions in $Mo_2Ga_2C$ determined from Rietveld analysis of XRD pattern shown in FIG. 1. The space group was P63/mmc. The a and c-lattice parameters were calculated to be 3.03662(4) Å and 18.0855(3) Å, respectively.

| Element | x | y | z | Wykcoff positions |
|---|---|---|---|---|
| Mo | ⅓ | ⅔ | 0.06434 (10) | 4f |
| Ga | ⅓ | ⅔ | 0.68238 (10) | 4f |
| C | 0 | 0 | 0 | 2a |

The following references may be useful in understanding some elements of the present invention or background principles thereof 1. M. W. Barsoum, *MAX Phases: Properties of Machinable Carbides and Nitrides*, Wiley VCH GmbH & Co., Weinheim, 2013.
2. P. Eklund, M. Beckers, U. Jansson, H. Hogberg and L. Hultman, *Thin Solid Films*, 2010, 518 1851-1878.
3. Z.-M. Sun, *International Materials Reviews*, 2011, 56, 143-166.
4. L. Toth, *J. Less Comm. Met.*, 1967, 13 129-131.
6. I. R. Shein and A. L. Ivanovskii, *Physica C*, 2010, 470, 533-537.
7. R. P. Ziebarth, J. K. Vassiliou and F. J. Disalvo, *J. Less Comm. Met.*, 1989, 156, 207-211.
8. O. Beckmann, H. Boller and H. Nowotny, *Monatsh. Chem.*, 1970, 101, 945 955.
9. H. Kudielka and H. Rohde, *Z. Kristalogr.*, 1960, 114, 447.
10. H. Nowotny, *Prog. Solid State Chem.*, 1970, 2, 27-70.
11. M. W. Barsoum, L. Farber, I. Levin, A. Procopio, T. El-Raghy and A. Berner, *J. Amer. Cer. Soc.*, 1999, 82, 2545-2547.
12. A. Petruhins, A. S. Ingason, M. Dahlqvist, A. Mockute, M. Junaid, J. Birch, J. Lu, L. Hultman, P. O. Å. Persson and J. Rosen, *Phys. Status Solidi RRL*, vol. 7, no. 11, pp. 971-974, 2013.

It is to be understood that while the invention has been described in conjunction with the preferred specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. In addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document are hereby incorporated herein by reference, each in its entirety, for all purposes.

What is claimed:

1. A crystalline solid having an empirical formula of $M_2A_2X$,
   wherein M is Cr, Hf, Sc, Ti, Mo, Nb, Ta, V, Zr, or a combination thereof;
   wherein A is Al, Ga, Ge, In, Pb, or Sn, or a combination thereof; and
   each X is $C_xN_y$, where x+y=1.

2. The crystalline solid of claim 1 that is $Cr_2Ga_2C$, $Cr_2Ga_2N$, $Mo_2Ga_2C$, $Mo_2Ga_2N$, $Nb_2Ga_2C$, $Nb_2Ga_2N$, $Ta_2Ga_2C$, $Ta_2Ga_2N$, $Ti_2Ga_2C$, $Ti_2Ga_2N$, $V_2Ga_2C$, or $V_2Ga_2N$.

3. The crystalline solid of claim 1 that is $Hf_2In_2C$, $Hf_2In_2N$, $Hf_2Sn_2C$, $Hf_2Sn_2N$, $Nb_2In_2C$, $Nb_2In_2N$, $Nb_2Sn_2C$, $Nb_2Sn_2N$, $Sc_2In_2C$, $Sc_2In_2N$, $Ti_2In_2C$, $Ti_2In_2N$, $Ti_2Sn_2C$, $Ti_2Sn_2N$, $Zr_2In_2C$, $Zr_2In_2N$, $Zr_2Sn_2C$, or $Zr_2Sn_2N$.

4. The crystalline solid of claim 1, wherein the empirical formula is defined by the unit cell stoichiometry of the crystalline solid.

5. The crystalline solid of claim 1, having a unit cell stoichiometry of $Mo_2Ga_2C$.

6. The crystalline solid of claim 5, in which two layers of Ga atoms are stacked between otherwise adjacent $Mo_2C$ layers.

7. The crystalline solid of claim 5, wherein the Ga atoms are stacked in a simple hexagonal arrangement of atoms.

8. The crystalline solid of claim 1, wherein A is Ga, In, or Sn, and in which two layers of Ga, In, or Sn atoms are stacked between layers of $Cr_2C$, $Cr_2N$, $Hf_2C$, $Hf_2N$, $Mo_2C$, $Mo_2N$, $Nb_2C$, $Nb_2N$, $Sc_2C$, $Sc_2N$, $Ta_2C$, $Ta_2N$, $Ti_2C$, $Ti_2N$, $V_2C$, $V_2N$, $Zr_2C$, or $Zr_2N$.

9. The crystalline solid of claim 1 comprising molybdenum, gallium, and carbon exhibiting at least five of the following characteristic X-ray powder diffraction peaks (Cu Kα radiation, expressed in degrees 2θ) at approximately 9.8, 34.1, 37.3, 39.9, 42.5, 53.4, 61.0, and 75.4 and optionally other one or more additional peaks at approximately 67.1, 73.7, 77.2, or 77.6 degrees 2θ.

10. The crystalline solid of claim 1 consisting essentially of molybdenum, gallium, and carbon exhibiting at least five of the following characteristic X-ray powder diffraction peaks (Cu Kα radiation, expressed in degrees 2θ) at approximately 9.8, 34.1, 37.3, 39.9, 42.5, 53.4, 61.0, and 75.4 and optionally other one or more additional peaks at approximately 67.1, 73.7, 77.2, or 77.6 degrees 2θ.

11. The crystalline solid of claim 1 comprising molybdenum, gallium, and carbon whose unit cell is characterized by a P63/mmc space group and having a and c-lattice parameters calculated to be about 3.04 Å and about 18.09 Å.

12. The crystalline solid of claim 1 comprising molybdenum, gallium, and carbon whose unit cell is characterized by the x, y, and z-positions and/or Wykcoff positions substantially as provided as:

| Element | x | y | z | Wykcoff positions |
|---|---|---|---|---|
| Mo | 1/3 | 2/3 | 0.06434 (10) | 4f |
| Ga | 1/3 | 2/3 | 0.68238 (10) | 4f |
| C | 0 | 0 | 0 | 2a. |

* * * * *